United States Patent [19]

Katsura et al.

[11] Patent Number: 4,664,714
[45] Date of Patent: May 12, 1987

[54] PIGMENT COMPOSITION

[75] Inventors: Hiromitsu Katsura; Shigeyuki Ehashi; Motohiko Kashioka; Makoto Sakamoto, all of Kyobashi, Japan

[73] Assignee: Toyo Ink Manufacturing Co., Ltd., Tokyo, Japan

[21] Appl. No.: 721,557

[22] Filed: Apr. 10, 1985

[51] Int. Cl.$^4$ .................... C09D 3/64; C09D 3/72; C09D 3/74; C09D 11/2
[52] U.S. Cl. ............................. 106/308 N; 106/23; 106/288 Q; 106/308 Q; 534/598; 534/612; 534/638; 534/742; 534/798; 534/801; 534/803; 534/868; 544/187; 544/198; 544/212; 540/126
[58] Field of Search ............... 534/801, 798, 803, 612; 106/288 Q, 308 N, 308 Q

[56] References Cited

U.S. PATENT DOCUMENTS

| | | | |
|---|---|---|---|
| 3,177,214 | 4/1965 | Sulzer et al. | 534/803 X |
| 3,310,416 | 3/1967 | Schibler | 106/308 N X |
| 3,527,746 | 9/1970 | Canonica et al. | 534/638 X |
| 4,145,340 | 3/1979 | Ridyard | 534/632 |
| 4,314,001 | 2/1982 | Wesseler | 106/308 N X |
| 4,363,761 | 12/1982 | Pedrazzi | 534/638 X |
| 4,465,627 | 8/1984 | Pedrazzi | 534/612 X |
| 4,486,348 | 12/1984 | Kynde | 534/612 X |

Primary Examiner—Floyd D. Higel
Attorney, Agent, or Firm—Bucknam and Archer

[57] ABSTRACT

A pigment composition consisting of 100 parts by weight of a pigment, and from 0.1 to 30 parts by weight of a pigment dispersant of formula

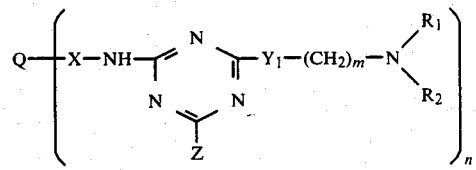

in which Q is (a) an anthraquinone dye or pigment radical, (b) an azo dye or pigment radical, (c) a benzimidazolone dye or pigment radical, (d) a phthalocyanine dye or pigment radical, (e) a quinacridone dye or pigment radical, (f) a dioxazine dye or pigment radical, (g) an anthrapyrimidine dye or pigment radical, (h) an anthanthrone dye or pigment radical, (i) an indanthrone dye or pigment radical, (j) a falvanthrone dye or pigment radical, (k) a pyranthrone dye or pigment radical, (l) a perinone dye or pigment radical, (m) a perylene dye or pigment or (n) a thioindigo dye or pigment radical; X is a direct bonds, —CH$_2$—;

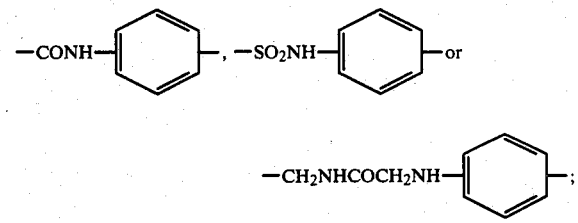

$Y_1$ is NH or —O—; Z is

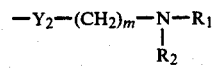

in which $Y_2$ is —NH— or —O—, or —NH—X—Q when n is 1; $R_1$ and $R_2$ are independently an alkyl group containing 1–18 carbon atoms, or are jointly combined to form a piperidine, pyrrolidine, pipecoline or morpholine ring with the nitrogen atom to which they are attached; m is an integer of 1 to 6; and n is an integer of 1 to 4. The pigment compositions exhibit improved fluidity, superior stability and gloss.

12 Claims, No Drawings

PIGMENT COMPOSITION

BACKGROUND OF THE INVENTION

1. Field of the Invention

This invention relates to pigment dispersants which have good usability and are particularly effective in rendering pigments non-floculating and non-crystallizing in nature.

2. Description of the Prior Art

In general useful pigments which exhibit bright color and high color strength in ordinary various coating compositions consist of fine particles. However, it is known that when fine pigment particles are attempted to be dispersed on non-aqueous vehicles such as offset inks, gravure inks and paints, it is difficult to obtain stable dispersions, with various problems being involved in manufacturing operations. Such problems give important influences on the value of final products.

For instance, dispersions comprising pigments in the form of fine particles have often high viscosity, which makes it difficult to withdraw the dispersion product from a dispersion machine and transport it. In a worse case, the dispersion may gel during storage and cannot be used. Where different types of pigments are used in combination, lack of color uniformity and/or a considerable lowering of color strength may be experienced in pigment compositions due to the separation or flocculation by agglomeration of the pigments and also due to the settlement thereof. In addition, the surface of the film obgtained from such pigment composition may involve some drawbacks such as lowering of gloss, leveling failure, and the like.

Although not directly related to the dispersion of pigment, there is known a phenomenon inherent to some organic pigments in which the crystalline state of the pigment varies. More particularly, when placed in non-aqueous vehicles such as of offset inks, gravure inks and paints, crystal particles of a pigment which are unstable from the standpoint of energy are varied in size and shape, and are converted to a more stable state. As a consequence, the composition suffers a considerable change of hue, a reduction of color strength, and formation of coarse particles, thus lowering the commercial value to a substantial extent.

SUMMARY OF THE INVENTION

It is an object of the present invention to provide a pigment composition containing a compound for use as a pigment dispersant (the compound being hereinafter referred to as a "pigment dispersant" for brevity) which overcome the prior art problems as will be experienced in non-aqueous vehicles of offset inks, gravure inks and paints.

It is another object of the invention to provide novel pigment dispersants which are non-flocculating and stable in crystal phase when used with the pigments in non-aqueous vehicles.

It is a further object of the invention to provide pigment dispersants which have very good dispersability in various resins ordinarily used in the field of inks and paints.

The pigment dispersant dispersing agents for pigment according to the invention is represented by the following general formula (1)

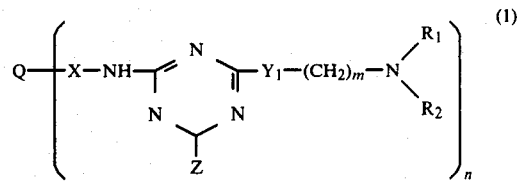

in which Q represents an organic dye or pigment residue; X represents a direct bond, —CH$_2$—,

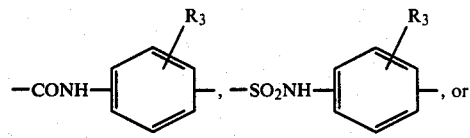

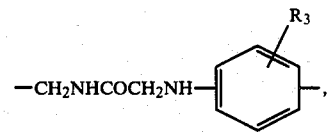

wherein R$_3$ is a hydrogen atom, an alkyl group, an alkoxy group or a halogen atom; Y$_1$ represents —NH— or —O—; Z represents a hydroxyl group, an alkoxy group or

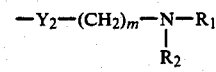

wherein Y$_2$ represents —NH— or —O—, or —NH—X—Q provided when n=1; R$_1$ and R$_2$ independently represent a substituted or unsubstituted alkyl group, or are jointly combined to form a heterocyclic ring comprising at least a nitrogen atom; m is an integer of 1 to 6; and n is an integer of 1 to 4.

DETAILED DESCRIPTION AND EMBODIMENTS OF THE INVENTION

In order to improve flocculation resistance and crystal stability of pigments, there have been proposed a number of pigments including copper phthalocyanine and quinacridone pigments.

The improvements may be broadly classified into the following two groups.

The first group is a method which comprises covering pigment particles with colorless compounds such as silicon oxide, aluminum oxide, and tertiary butyl benzoate as is described, for example, in U.S. Pat. Nos. 3,370,971 and 2,965,511.

The second group is a method, as described, for example, in Japanese Patent Publication No. 41-2466 and U.S. Pat. No. 2,855,403, in which specific types of compounds which are obtained by introducing substituents such as sulfone group, sulfoneamido group, aminomethyl group, and phthalimidomethyl group, into the side chains of an organic pigment.

The pigments obtained from the latter method are much more effective than those from the former method with respect to the flocculation resistance and crystal stability of the pigments, and can be readily produced. In this sense, the method of the second group is considered to be a very advantageous method.

Examples of pigment dispersants of the invention may be represented by the following general formulae (2), (3), (4), (5) and (6)

in which A represents an amino group or hydroxyl group; m is an integer of from 1 to 6, and $R_1$ and $R_2$ have, respectively, the same meanings as defined before.

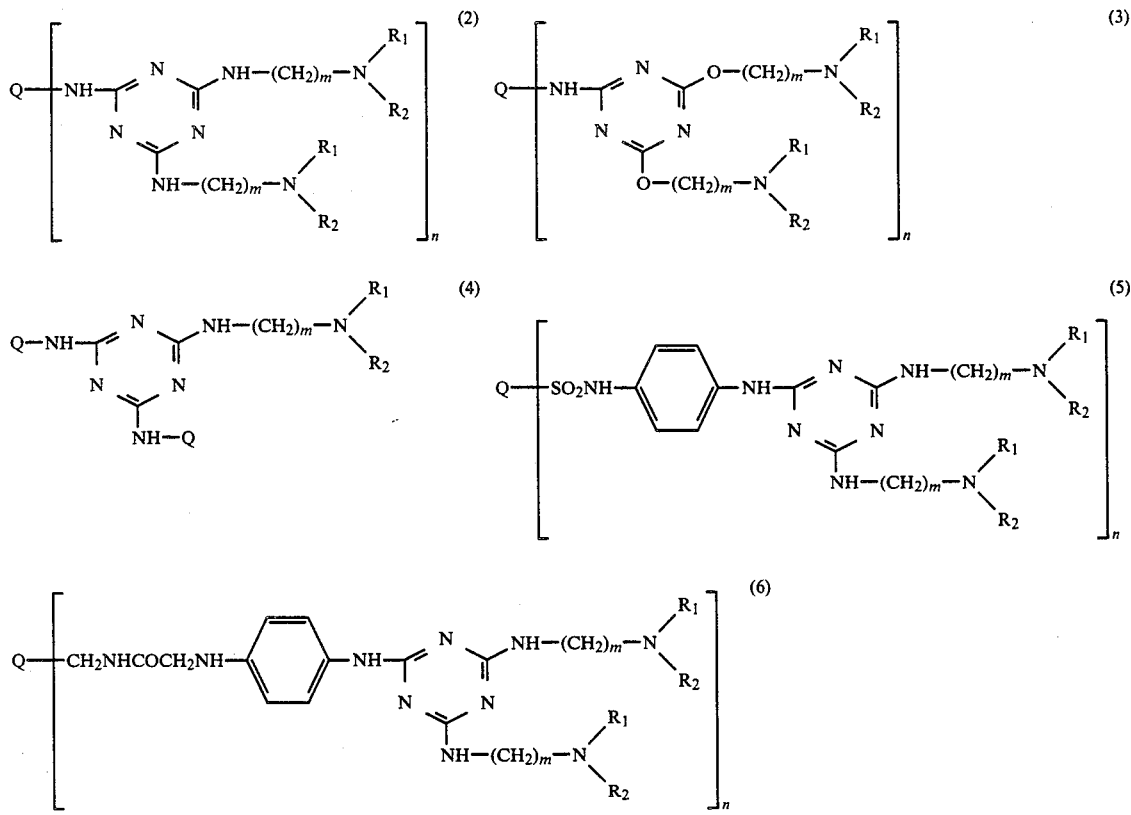

in which each Q represents an organic dye or pigment residue; each m is an integer of from 1 to 6; each n is an integer of from 1 to 4; and each $R_1$ and each $R_2$ independently represent a substituted or unsubstituted alkyl group, or are combined to form a heterocyclic ring containing a nitrogen atom, or a nitrogen atom and an oxygen or sulfur atom.

The organic dyes or pigments which are one of starting materials for the pigment dispersants of the invention may be commercially available dyes or pigments. Examples of the organic dyes or pigments include anthraquinone dyes or pigments, azo dyes or pigments, phthalocyanine dyes or pigments, quinacridone dyes or pigments, dioxazine dyes or pigments, anthrapyrimidine dyes or pigments, anthrathrone dyes or pigments, indanthrone dyes or pigments, flavanthrone dyes or pigments, pyranthrone dyes or pigments, perinone dyes or pigments, perylene dyes or pigments, thioindigo dyes or the pigments, and the like.

A typical method of preparing a pigment dispersant of the invention is described. An organic dye or pigment having, for example, an amino group, cyanuric chloride, amines and/or alcohols of the following general formula (7), are interacted

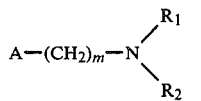 (7)

Alternatively, p-aminoacetoanilide is diazotized by a usual manner and then coupled with various couplers which are starting materials for azo dyes or pigments, followed by hydrolysis by a usual manner to prepare organic dyes or pigments having an amino group. Still alternatively, a phthalimidomethyl group is introduced into dyes or pigments by a usual method and is then converted into an aminomethyl group by hydrolysis to obtain aminoethyl group-containing dyes or pigments for use as a starting material. Any other techniques may be used to prepare organic dyes or pigments having amino groups for use as a starting material for the organic dispersant of the present invention.

The reaction betwen organic dyes or pigments having amino groups and cyanuric chloride is carried out in water or ordinary organic solvents such as acetone, dioxane, xylene, and dimethylformamide. When organic dyes or pigments having amino groups also have a sulfone group, they are dissolved in water in the form of a sodium salt and reacted with cyanuric chloride. In some cases, it may be preferred that ordinary dehydrochlorination catalysts such as pyridine, triethylamine and the like are used.

For the reaction between organic dyes or pigments having amino groups and cyanuric chloride, the active chlorine of the cyanuric ring is partially reacted with amines and/or alcohols of the general formula.

It will be noted that even though a compound which is obtained by reaction between all chlorine atoms of the cyanuric ring and the amino groups of organic dyes or pigments is secondarily produced and incorporated in the pigment dipersant of the invention, little or no adverse influences on the dispersant are shown.

When the reaction product of organic dyes or pigments having amino groups and cyanuric chloride is further reacted with amines and/or alcohols of the general formula (7), water or organic solvents such as acetone, dioxane, xylene and dimethylformamide may be used in the reaction system. Dehydrochlorination agents such as sodium carbonate, pyridine and triethylamine are preferably used in some instances. In case where the reaction product of organic dyes or pigments having amino groups and cyanuric chloride is treated with amines and/or alcohols of the general formula (7), it is the most advantageous from the industrial standpoint that the amines and/or alcohols are directly related to the reaction system comprising the organic dye or pigment and cyanuric chloride without withdrawing the reaction product thereof, thereby producing a pigment dispersant of the invention. The amines or alcohols are not necessarily separately used in the reaction system, but both amines and alcohols may be subjected to the reaction simultaneously in the reaction system. Moreover, even though part of the active chlorine of the cyanuric ring either remains unreacted, or undergoes hydrolysis to give a compound having hydroxyl groups as a side product, little adverse influences are given on the properties of the resulting final pigment dispersants.

As a matter of course, the pigment dispersant of the invention mahy be prepared by reacting cyanuric chloride first with amines and/or alcohols of the general formula (7) under conditions which permit part of the active chlorine atoms of the cyanuric chloride to remain unreacted, and then reacting the remaining active chlorine with the amino group of an organic dye or pigment. Alternatively, the cyanuric ring may be introduced first into starting materials of dyes or pigments, and a final compound may be used as a pigment dispersant of the invention. For instance, cyanuric chloride, p-aminoacetoanilide, and an amine and/or an alcohol of the general formula (7) are reacted, hydrolyzed as usual to obtain a base, followed by diazotizing the base and coupling with couplers of ordinary azo dyes or pigments, thereby obtaining pigment dispersants.

When organic dyes or pigments having no amino group are used as the starting material, chlorosulfonated products, acic chlorides, chloroacetateamidomethylated product of organic dyes or pigments are reacted with bases of the following formula (8) to obtain pigment dispersants of the invention

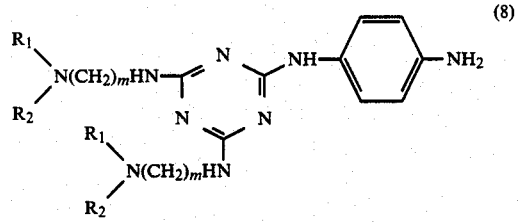

(8)

Examples of the amines of the general formula (7) include N,N-dimethylaminoethylamine, N,N-diethylaminoethylamine, N,N-dibutylaminopropylamine, N,N-dimethylaminopropylene, N,N-diethylaminopropylamine, N,N-dibutylaminopropylamine, N,N-dimethylaminobutylamine, N,N-diethylaminopropylamine, N,N-dipropylaminobutylamine, N,N-dibutylaminobutylamine, N,N-diisobutylaminopentylamine, N,N-diethylaminopentylamine, N,N-diethylaminohexylamine, N-aminomethylpiperidine, N-aminoethylpiperidine, N-aminopropylpiperidine, N-aminoethylpyrrolidine, N-aminopropylpyrrolidine, N-aminoethylpipecoline, N-aminopropylpipecoline, N-aminoethylmorpholine, N-aminopropylmorpholine, N,N-methyl-laurylaminopropylamine, N,N-dioleylaminoethylamine, N,N-distearylaminobutylamine, and the like.

The alcohols of the general formula (7) include, for example, N,N-dimethylaminomeethanol, N,N-dimethylaminoethanol, N,N-diethylaminoethanol, N,N-dibutylaminoethanol, N,N-dibutylaminoethanol, N,N-dibutylaminopropanol, N,N-diethylaminobutanol, N,N-dioleylbutanol, N-hydroxymethylpiperidine, N-hydroxyethylpiperidine, N-hydroxypropylpiperidine, N-hydroxyethylpipecoline, N-hydroxypropylpipecoline, N-hydroxymethylpyrrolidine, N-hydroxybutylpyrrolidine, N-hydroxyethylmorpholine, N-hydroxybutylmorpholine, and the like.

The pigment dispersants of the invention exhibit good dispersing effects on all types of commercially sold pigments. For instance, the dispersants may be applied to organic pigments including azo pigments such as soluble or insoluble or condensation azo pigments, phthalocyanine pigments, quinacrodone pigments, isoindolinone pigments, perinone pigments, perylene pigments, dioxazine pigments, vat dye pigments, basic dye pigments, and the like, and inorganic pigments such as carbon black, titanium oxide, chrome yellow, cadmium yellow, cadmium red, red oxide, black oxide of iron, zinc flower, Prussian blue, ultramarine blue, and the like.

The pigment dispersant is generally used in an amount of from 0.1 to 30 parts by weight per 100 parts of a pigment. Less amounts are unfavorable because satisfactory dispersion effects cannot be obtained, whereas larger amounts are not preferred since a further effect cannot be expected.

The pigment dispersant of the invention may be applied as follows.

1. A pigment composition, which is obtained by mixing a pigment and the pigment dispersant, is added to and dispersed in a non-aqueous vehicle, etc.
2. A pigment and the pigment dispersant are separately added to a non-aqueous vehicle etc. and dispersed.
3. A pigment and the pigment dispersant are dispersed in separate non-aqueous vehicles, etc., and the resultant dispersions are combined.
4. A pigment is first dispersed in a non-aqueous vehicle etc., to which the pigment dispersant is added.

The above four methods may be similarly used to attain the effects of the invention.

The pigment composition indicated in (1) above may be prepared by merely mixing pigment powder with powder of the pigment dispersant of the invention, but better results are obtained by various methods. Such methods include a mechanical mixing method using kneaders, roll mills, attritors, supermills and other grinding machines, a method in which a solution or a suspension comprising a pigment dispersant of the invention is added to a suspension of a pigment in water or organic solvents so that the pigment dispersant is deposited on the pigment surface, and a method in which an organic pigment and the pigment dispersant are both dissolved in a solvent having high solvency power, such as sulfuric acid, and co-precipitated using a poor solvent such as water.

When pigments and the pigment dispersant are dispersed in non-aqueous vehicles or solvents as in (2) through (4), it is preferred to use, for better mixing and dispersion of the pigments, suitable dispersion machines such as dissolvers, high speed mixers, homomixers, kneaders, roll mills, sand mills, attritors and the like.

When using the pigment dispersant of the invention, pigments can be readily dispersed in various non-aqueous vehicles including, for example, offset ink vehicles such as of various rosin-modified resins, gravure inks such as lime rosin varnish (vehicle), polyamide resin varnish and vinyl chloride resin varnish, cold setting or baking paints such as nitro cellulose lacquer and aminoalkyd resin lacquer, and urethane resin paints. More particularly, as compared with the case where pigments alone are used, the dispersion of the pigments using the pigment dispersant of the invention has a number of advantages that the dispersion has decreased viscosity and structural viscosity with good fluidity; no problems are involved with respect to flocculation and change of crystal; and the printed matter or film obtained from the pigment dispersion using the dispersant according to the invention has good gloss and thus the resulting final products are beautiful in appearance. With known pigment dispersants, it was experienced that the dispersion effect was shown on oil-modified aminoalkyd resin paints, but no effect was shown on oil-free aminoalkyd resin paints. In this connection, the pigment dispersant of the invention has a good dispersion effect not only on oil-modified aminoalkyd resin paints, but also on oil-free alkyd resin paints.

Furthermore, the pigment dispersant of this invention is used in coloring polyolefines, polyesters or vinyl resin etc. with a pigment.

Preparation of pigment dispersants of the invention are described in the following preparatory examples, in which parts are by weight.

PREPARATORY EXAMPLE 1

19 parts of an azo dye of the following formula and 19 parts of cyanuric chloride were added to 400 parts of dioxane, followed by agitating at 90° to 100° C. for 4 hours

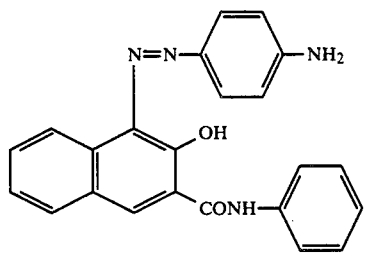

Thereafter, the reaction solution was cooled and filtered to obtain 20 parts of a compound of the following formula

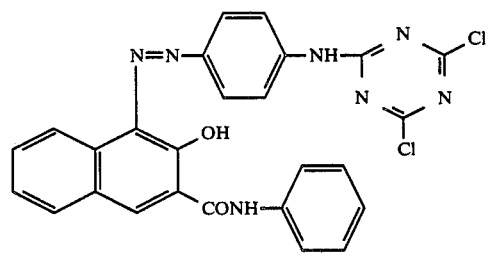

Subsequently, 20 parts of the thus obtained compound and 19 parts of N,N-dibutylaminopropylamine were added to 30 parts of dioxane and agitated at 90° to 100° C. for 3 hours. After cooling, the reaction solution was poured into 2000 parts of iced water, followed by filtering and washing with water. The resulting filter cake was re-slurried in 1000 parts of water and adjusted to a pH of 9 to 10 by means of sodium carbonate, followed by agitating for further 1 hour, filtration, washing with water, and drying to obtain 30 parts of pigment dispersant (a) having a main component of the following structural formula

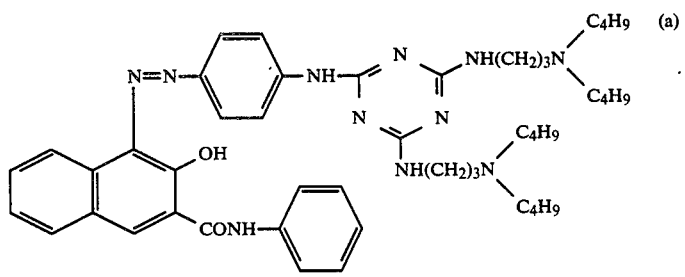

PREPARATORY EXAMPLE 2

The general procedure of Preparatory Example 1 was repeated except that 15 parts of N,N-dimethylaminoethanol was used instead of 19 parts of N-dibutylaminopropylamine, thereby obtaining 21 parts of pigment dispersant (b) having a main component of the following structural formula

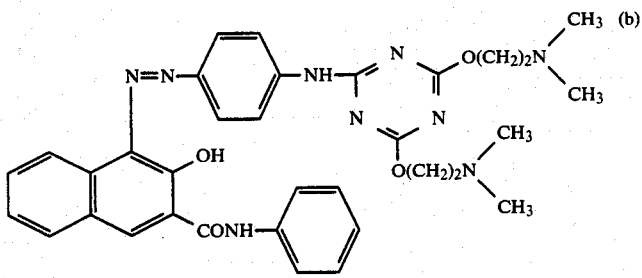

PREPARATORY EXAMPLE 3

19 parts of cyanuric chloride, 15 parts of p-aminoacetoanilide, and 11 parts of sodium carbonate serving as dehydrochlorination agent were added to a mixed solvent of 200 parts of acetone and 100 parts of water, and agitated at 30° to 40° C. for 1 hour. Thereafter, 30 parts of N,N-diethylaminopropylamine was dropped into the solution at the same temperature and then agitated at 50° to 60° C. for 3 hours. After completion of the reaction, the reaction solvent was distilled off under reduced pressure, followed by adding 300 parts of 1% hydrochloric acid and agitating for hydrolysis at 90° to 100° C. for further 1 hour. The reaction solution was cooled, to which sodium hydroxide was added for neutralization and adjusted to a pH of 9 to 10, thereby obtaining 40 parts of a base of the following structural formula

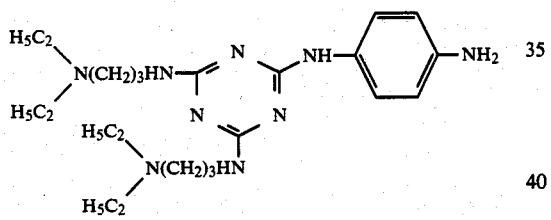

20 parts of the thus obtained base was diazotized by a usual manner and subjected to coupling reaction with 12 parts of 5-acetoacetylaminobenzimidazolone at a pH of 9 to 10, thereby obtaining 32 parts of pigment dispersant (c) having a main component of the following formula

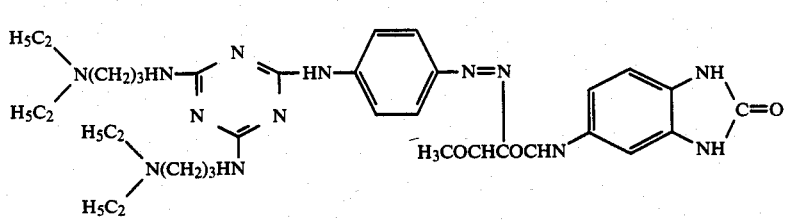

PREPARATORY EXAMPLE 4

9 parts of an anthraquinone pigment of the following formula and 37 parts of cyanuric chloride were added to 150 parts of dioxane and agitated at 90° to 100° C. for 10 hours.

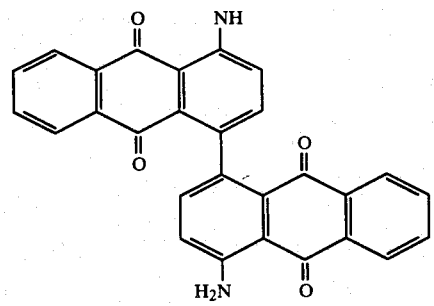

The reaction solution was cooled, filtered and dried to obtain 14 parts of a compound of the following formula

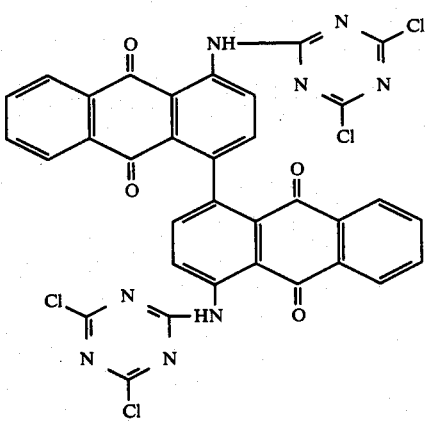

Subsequently, 10 parts of the above compound and 12 parts of N-aminopropyl-2-pipecoline were added to 100 parts of dioxane and agitated at 90° to 100° C. for 3 hours. The reaction solution was cooled and poured into 1000 parts of iced water, to which 10 parts of sodium carbonate was added, followed by filtration, washing with water and drying to obtain 15 parts of pigment dispersant (d) having a main component of the following formula

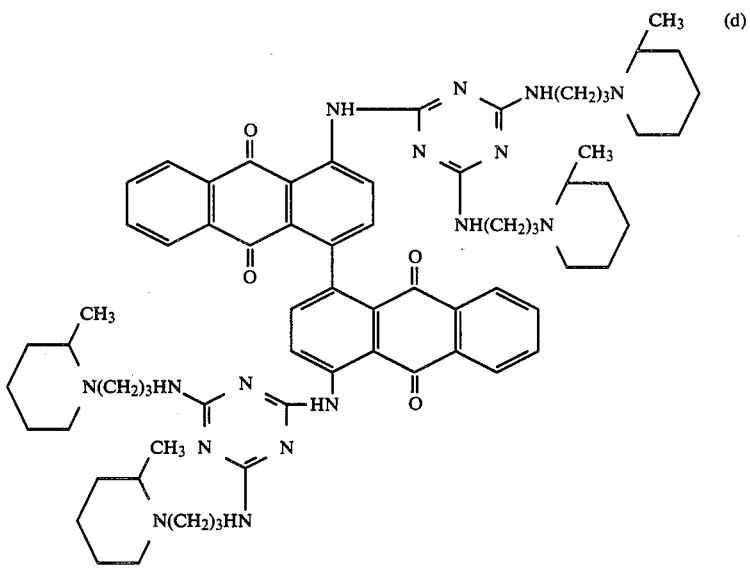

PREPARATORY EXAMPLE 5

30 parts of a quinacridone pigment of the following structural formula and 56 parts of cyanuric chloride were added to 300 parts of dimethylformamide, followed by agitating at 130° to 140° C. for 5 hours.

and agitated at 90° to 100° C. for 5 hours. The reaction solution was cooled and filtered to obtain a cake. This cake was re-slurried in 1000 parts of water, to which was added sodium carbonate to make the pH at 10, followed by agitation for 1 hour, filtration, washing with water, and drying to obtain 45 parts of pigment dispersant (e) having a main component of the following formula

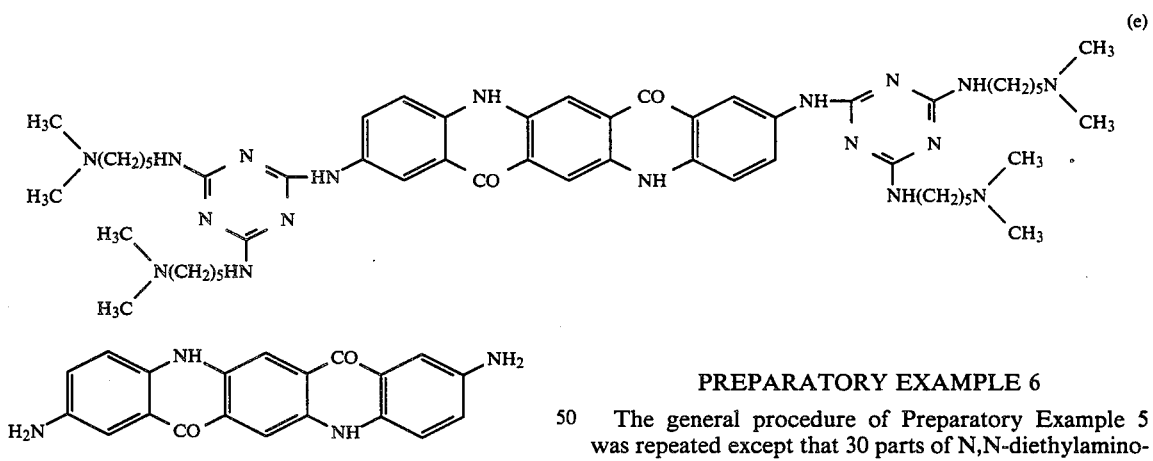

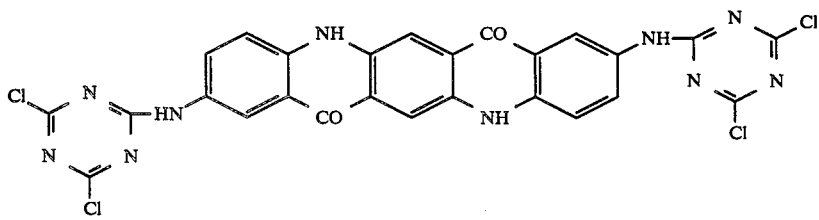

The reaction solution was cooled and filtered to obtain 58 parts of a compound of the following formula

PREPARATORY EXAMPLE 6

The general procedure of Preparatory Example 5 was repeated except that 30 parts of N,N-diethylaminoethanol was used instead of 33 parts of N,N-dimethylaminopentylamine, thereby obtaining 38 parts of pigment dispersant (f) having a main component of the Subsequently, 30 parts of the thus obtained compound, 33 parts of N,N-dimethylaminopentylamine, and 10 parts of pyridine were added to 500 parts of dioxane following formula

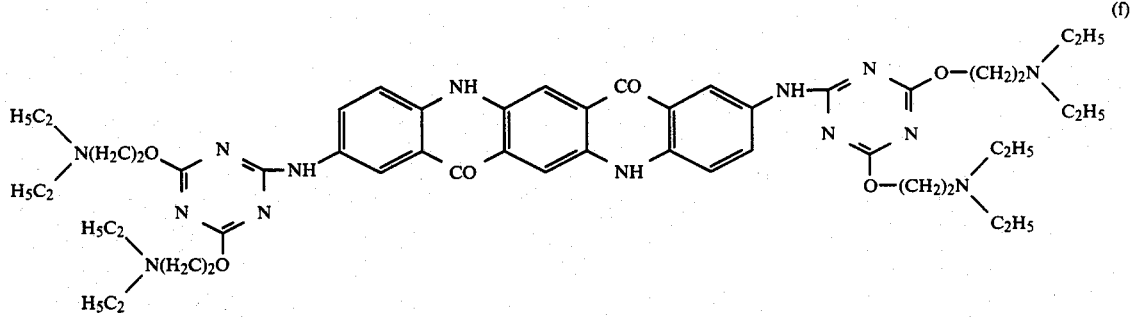

(f)

PREPARATORY EXAMPLE 7

30 parts of tetramino copper phthalocyanine and 56 parts by cyanuric chloride were added to 500 parts of dimethylformamide, followed by agitating at 140° to 150° C. for 3 hours, cooling and filtering to obtain 57 parts of a compound having the following formula

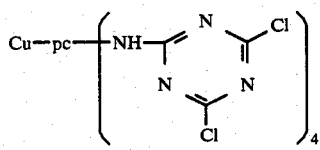

in which Cu-pc represents a copper phthalocyanine residue.

Thereafter, 20 parts of the thus obtained compound, 25 parts of N-aminopropylmorpholine, and 10 parts of pyridine were added to 300 parts of dioxane and agitated at 110° to 120° C. for 10 hours, followed by cooling, filtering and drying to obtain 30 parts of pigment dispersant (g) comprising a main component of the following formula

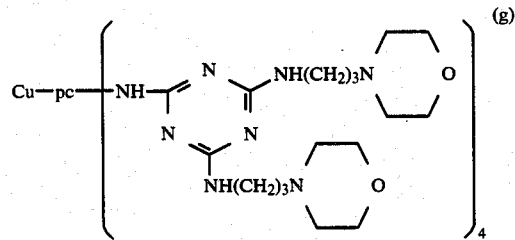

(g)

in which Cu-pc represents a copper phthalocyanine.

PREPARATORY EXAMPLE 8

33 parts of 1-aminoanthraquinone and 13 parts of cyanuric chloride were added to 300 parts of xylene, followed by agitating at 120° to 130° C. for 5 hours. The solution was cooled down to 50° to 60° C., into which 26 parts of N,N-diethylaminopropylamine was dropped while keeping the temperature, followed by further agitation at 100° to 110° C. for 2 hours. The reaction solution was cooled, filtered and washed with methanol, after which the resulting cake was re-slurried in 1000 parts of water. Sodium hydroxide was added to the slurry to adjust the pH to 9 to 10, followed by agitating for 1 hour, filtering, washing with water, and drying to obtain 41 parts of pigment dispersant (h) comprising a main component of the following formula

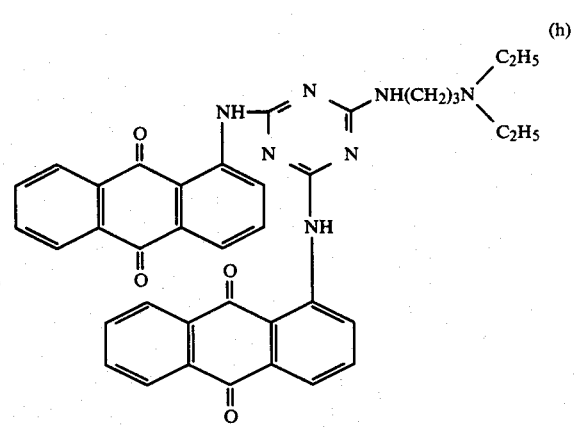

(h)

PREPARATORY EXAMPLE 9

15 parts of a quinacridone pigment of the following formula and 30 parts of cyanuric chloride were added to 300 parts of dimethylformamide, followed by agitating at 130° to 140° C. for 5 hours.

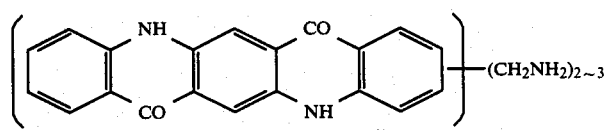

The reaction solution was cooled, filtered, and dried to obtain 39 parts of a compound of the following formula

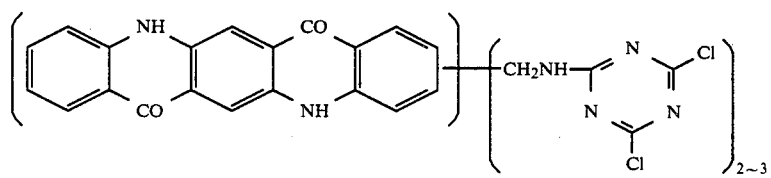

Subsequently, 20 parts of the thus obtained compound and 25 parts of N,N-dibutylaminoethylamine were added to 300 parts of dimethylformamide and agitated at 130° to 140° C. for 3 hours. The reaction solution was cooled, filtered, and re-slurried in 1000 parts of water, to which sodium carbonate was added in order to adjust the pH to 9 to 10, followed by filtering, washing with water, and drying to obtain 29 parts of pigment dispersant (i) having a main component of the following structural formula

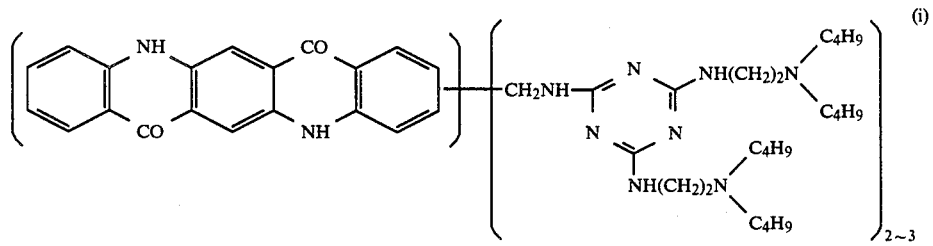

PREPARATORY EXAMPLE 10

25 parts of a chlorosulfonated product of copper phthalocyanine of the following formula and 60 parts of the base of Preparatory Example 3 were added to 300 parts of methanol, followed by heating under reflux.

$Cu\text{-}pc\text{-}(SO_2Cl)_{1\sim3}$ in which Cu-pc represents a copper phthalocyanine residue. After completion of the reaction, 3000 parts of water and 10 parts of sodium hydroxide were added, followed by filtering, washing with water, and drying to obtain 50 parts of pigment dispersant (j) having a main component of the following formula

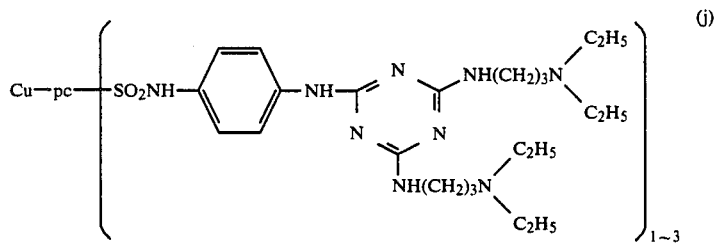

PREPARATORY EXAMPLE 11

18 parts of an amidomethylated product of quinacridonechloroacetate of the following formula and 60 parts of the base of Preparatory Example 3 were added to 300 parts of methanol, followed by heating for 3 hours under reflux.

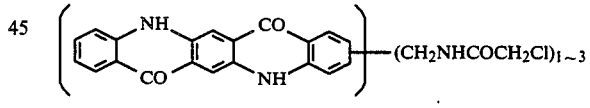

After completion of the reaction, 3000 parts of water and 10 parts of sodium hydroxide were added to the reaction solution, followed by filtering, washing with water, and drying to obtain 45 parts of pigment dispersant (k) having a main component of the following formula

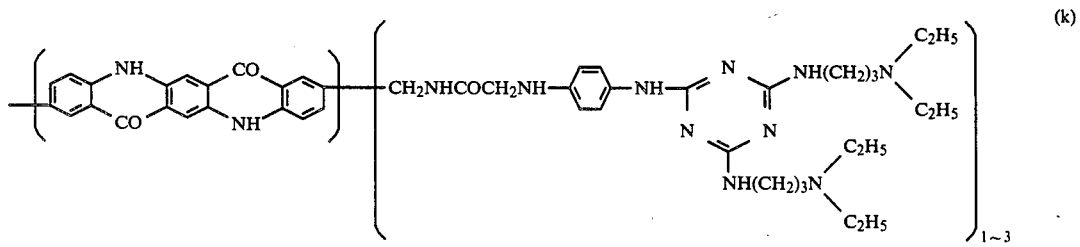

The present invention is described in more detail by way of examples and comparative example, in which alphabetic symbols indicating pigment compositions are those used in preparatory examples.

EXAMPLE 1

C.I. Pigment Yellow 83 was added to a gravure vinyl chloride resin varnish in an amount of 10% and dispersed in a sand mill to obtain a pigment dispersion (Comparative Example).

The powder of pigment dispersant (c) was added to the thus obtained pigment dispersion in an amount of 10 wt.% of the C.I. Pigment Yellow 83, followed by uniformly agitating of the use of a dissolver, thereby obtaining a gravure ink. The gravure ink was subjected to measurement of viscosity and compared with a viscosity of the comparative pigment dispersion.

The results are shown in Table 1, from which the fluidity of the gravure ink of the invention is better than the comparative dispersion. The printed matter using the gravure ink had more pronounced effects with respect to brightness, color strength, and gloss.

On the other hand, pigment dispersant (c) was dispersed in a vinyl chloride resin varnish for gravure ink by the use of a sand mill to obtain a dispersion. When the dispersion was added so that the ratio by weight of C.I. Pigment Yellow 83 and pigment dispersant (c) was 9:1, similar results were obtained.

COMPARATIVE EXAMPLES AND EXAMPLES 2–16

Gravure Ink Test

Various pigments were dispersed in a vinyl chloride resin varnish for gravure ink in an amount of 10% (or 25% for inorganic pigments) to provide comparative dispersions. On the other hand, after dispersion of various pigments, the pigment dispersants obtained in Preparatory Examples 1 through 9 were added to the respective dispersions to obtain gravure inks. The inks were subjected to measurement of viscosity with the results shown in Table 1. The inks of the invention are better in fluidity than the comparative dispersions.

The printed matters obtained by the use of the gravure inks had good brightness, color strength, and gloss.

TABLE 1

Viscosity of Gravure Inks (Brookfield BM-type Viscometer)

| Example | Pigment | Symbol for Dispersant | Number of Revolutions Mixing Ratio | Viscosity (cps.) 6 | 12 | 30 | 60 |
|---|---|---|---|---|---|---|---|
| (Com. Ex.) | C.I. Pig. Yellow 85 | — | — | 3530 | 1520 | 840 | 610 |
| Ex. 1 | C.I. Pig. Yellow 85 | c | 90:10 | 1400 | 1100 | 710 | 580 |
| 2 | C.I. Pig. Yellow 85 | c | 95:5 | 1530 | 1140 | 780 | 560 |
| 3 | C.I. Pig. Yellow 85 | a | 90:10 | 1480 | 1120 | 700 | 540 |
| 4 | C.I. Pig. Yellow 85 | h | 90:10 | 1530 | 1060 | 680 | 490 |
| 5 | C.I. Pig. Yellow 85 | i | 95:5 | 1620 | 1030 | 650 | 510 |
| Com. Ex. | C.I. Pig. Red 17 | — | — | 5380 | 2790 | 1800 | 980 |
| Ex. 6 | C.I. Pig. Red 17 | a | 90:10 | 2830 | 1380 | 820 | 620 |
| 7 | C.I. Pig. Red 17 | b | 95:5 | 2530 | 1320 | 740 | 540 |
| 8 | C.I. Pig. Red 17 | e | 90:10 | 2300 | 1170 | 620 | 540 |
| 9 | C.I. Pig. Red 17 | i | 90:10 | 2460 | 1100 | 710 | 510 |
| Com. Ex. | C.I. Pig. Red 48 | — | — | 6200 | 3100 | 1720 | 1240 |
| Ex. 10 | C.I. Pig. Red 48 | a | 90:10 | 3300 | 1320 | 910 | 870 |
| 11 | C.I. Pig. Red 48 | d | 95:5 | 2910 | 1390 | 940 | 830 |
| 12 | C.I. Pig. Red 48 | h | 90:10 | 2690 | 1310 | 930 | 820 |
| Com. Ex. | C.I. Pig. Yellow 34* | — | — | 870 | 620 | 560 | 520 |
| Ex. 13 | C.I. Pig. Yellow 34* | c | 95:5 | 650 | 440 | 370 | 310 |
| 14 | C.I. Pig. Yellow 34* | h | 90:10 | 670 | 500 | 410 | 320 |
| Com. Ex. | C.I. Pig. White 6* | — | — | 790 | 600 | 550 | 490 |
| Ex. 15 | C.I. Pig. White 6* | b | 95:5 | 620 | 460 | 390 | 360 |
| 16 | C.I. Pig. White 6* | f | 90:10 | 510 | 460 | 400 | 310 |

*Inorganic pigments, used in an amount of 25 wt. % of a gravure ink.

EXAMPLE 17

C.I. Pigment Blue 15 was added to an aminoalkyd resin varnish for baking paint in an amount of 6 wt.% and dispersed in a ball mill to obtain a pigment dispersion (comparative example). On the other hand, pigment dispersant (g) was dispersed in xylene by means of an attritor so as to obtain a thick xylene dispersion of pigment dispersant (g).

The pigment dispersion and the xylene dispersion of pigment dispersant (g) were uniformly mixed by means of a dissolver so that the ratio by weight of C.I. Pigment Blue 15 and pigment dispersant (g) was 9:1, followed by measurement of viscosity. The viscosity of the pigment dispersion for comparison was also measured. The results are shown in Table 2, revealing that the composition of the invention has better fluidity. When pigment dispersant (g) was added to the pigment dispersion in an amount of 10 wt.% based on the pigment in the dispersion and uniformly mixed by a dissolver. The resulting composition had similar effects.

EXAMPLES 18–38

Various pigments were dispersed in an aminoalkyd resin varnish for baking paint in an amount of 6% (or 25% when the pigments are inorganic pigments) to obtain comparative dispersions. On the other hand, after dispersion of various pigments, the pigment dispersions of Preparatory Examples 1 through 9 were added to the respective dispersions, thereby obtaining paints of the invention. The comparative dispersions and the paints of the invention were subjected to measurement of viscosity. The results are shown in Table 2.

The aminoalkyd resin paints of the invention had good fluidity and stability of crystals, and exhibited beautiful color and good color strength and gloss when films were formed from such paints. During storage, the viscosity rarely changed and thus, the paints had good storage stability.

TABLE 2

Viscosity of Aminoalkyd Resin Baking Paints (Brookfield BM-type Viscometer)

| Example | Pigment | Symbol for Dispersant | Number of Revolutions Mixing Ratio | Viscosity (cps.) 6 | 12 | 30 | 60 |
|---|---|---|---|---|---|---|---|
| Com. Ex. | C.I. Pig. Blue 15 | — | — | 8700 | 6100 | 3550 | 2600 |
| Ex. 17 | C.I. Pig. Blue 15 | g | 90:10 | 2530 | 1820 | 1190 | 1050 |
| 18 | C.I. Pig. Blue 15 | j | 95:5 | 2600 | 1600 | 1100 | 970 |
| 19 | C.I. Pig. Blue 15 | e | 90:10 | 2180 | 1240 | 1010 | 970 |
| Com. Ex. | C.I. Pig. Violet 19 | — | — | 8100 | 4600 | 2210 | 1230 |
| Ex. 20 | C.I. Pig. Violet 19 | a | 90:10 | 4760 | 3230 | 1700 | 980 |
| 21 | C.I. Pig. Violet 19 | b | 90:10 | 3820 | 2100 | 1150 | 980 |
| 22 | C.I. Pig. Violet 19 | k | 95:5 | 3470 | 2000 | 1150 | 960 |
| 23 | C.I. Pig. Violet 19 | e | 95:5 | 3430 | 2010 | 1010 | 950 |
| 24 | C.I. Pig. Violet 19 | i | 90:10 | 3480 | 2100 | 1130 | 970 |
| Com. Ex. | C.I. Pig. Yellow 48 | — | — | 8900 | 6300 | 3800 | 2700 |
| Ex. 25 | C.I. Pig. Yellow 48 | c | 90:10 | 3300 | 2100 | 1780 | 980 |
| 26 | C.I. Pig. Yellow 48 | c | 95:5 | 3820 | 1920 | 1190 | 960 |
| 27 | C.I. Pig. Yellow 48 | h | 90:10 | 3420 | 1920 | 1080 | 910 |
| Com. Ex. | C.I. Pig. Red 168 | — | — | 2200 | 1800 | 1610 | 1510 |
| Ex. 28 | C.I. Pig. Red 168 | d | 90:10 | 1080 | 910 | 760 | 590 |
| 29 | C.I. Pig. Red 168 | e | 90:10 | 1120 | 920 | 740 | 580 |
| 30 | C.I. Pig. Red 168 | f | 90:10 | 1070 | 810 | 700 | 570 |
| Com. Ex. | C.I. Pig. Red 177 | — | — | 3540 | 1620 | 980 | 720 |
| Ex. 31 | C.I. Pig. Red 177 | d | 90:10 | 1540 | 1020 | 740 | 520 |
| 32 | C.I. Pig. Red 177 | d | 95:5 | 1430 | 1080 | 710 | 420 |
| 33 | C.I. Pig. Red 177 | e | 90:10 | 1440 | 1020 | 740 | 610 |
| Com. Ex. | C.I. Pig. Red 179 | — | — | 8100 | 4500 | 2100 | 1250 |
| Ex. 34 | C.I. Pig. Red 179 | b | 90:10 | 3890 | 2100 | 1100 | 920 |
| 35 | C.I. Pig. Red 179 | d | 90:10 | 3550 | 2100 | 970 | 890 |
| Com. Ex. | C.I. Pig. Orange 36 | — | — | 700 | 600 | 520 | 480 |
| Ex. 36 | C.I. Pig. | b | 90:10 | 460 | 370 | 300 | 270 |

TABLE 2-continued

Viscosity of Aminoalkyd Resin Baking Paints
(Brookfield BM-type Viscometer)

| Example | Pigment | Symbol for Dispersant | Mixing Ratio | Viscosity (cps.) 6 | 12 | 30 | 60 |
|---|---|---|---|---|---|---|---|
| 37 | C.I. Pig. Orange 36 | c | 90:10 | 410 | 310 | 230 | 210 |
| 38 | C.I. Pig. Orange 36 | d | 95:5 | 420 | 400 | 380 | 290 |

With regard to dispersion stability, particularly color separation stability, which will give rise to problems in practical applications, the following test was conducted.

Several paints indicated in Table 2 were each cut with a previously prepared base paint of titanium oxide in an aminoalkyd resin varnish so that the ratio of the pigment and titanium oxide is 1/10, thereby obtaining a light-colored paint.

Each light-colored paint was further diluted with xylene and adjusted to a viscosity of 20 seconds at 25° C. using Ford Cup No. 4, followed by pouring into a test tube and visually observing any changes on the wall surfaces of the tube glass. The results are shown in Table 3.

TABLE 3

| Example No. | Pigment | Dispersant | Mixing Ratio | Immediately After Pouring | One Day After Pouring | One Week After Pouring |
|---|---|---|---|---|---|---|
| Com. Ex. | C.I. Pigment Blue 15 | — | — | Δ | x | x |
| Ex. 17 | C.I. Pigment Blue 15 | g | 90:10 | ⊚ | ⊚ | ⊚ |
| Com. Ex. | C.I. Pigment Violet 19 | — | — | Δ | x | x |
| Ex. 20 | C.I. Pigment Violet 19 | a | 90:10 | ⊚ | ⊚ | ⊚ |
| Com. Ex. | C.I. Pigment Red 168 | — | — | O | Δ | x |
| Ex. 28 | C.I. Pigment Red 168 | d | 90:10 | ⊚ | ⊚ | ⊚ |
| Com. Ex. | C.I. Pigment Red 179 | — | — | Δ | x | x |
| Ex. 35 | C.I. Pigment Red 179 | d | 90:10 | ⊚ | ⊚ | ⊚ |

Evaluation:
⊚: Completely uniform.
O : A slight, white streak recognized.
Δ: A white, streaked pattern recognized.
x: White substance completely separated.

As will be seen from the above results, the compositions of the invention are better than the comparative compositions.

EXAMPLE 39

C.I. Pigment Blue 15 was added to a nitro cellulose lacquer in an amount of 6 wt.%, followed by kneading with a three-roll mill to obtain a pigment dispersion for comparison.

When a pigment dispersion was prepared in the same manner as described above, pigment dispersant (g) was added to the dispersion in 5 wt.% by inner percentage with respect to the C.I. Pigment Blue 15 immediately before completion of the kneading, thereby obtaining a uniformly mixed paint. The comparative dispersion and the paint were subjected to measurement of viscosity for comparison. The results are shown in Table 4, from which it will be seen that the paint of the invention has better fluidity than the comparative dispersion.

When the above procedure was repeated except that a sand mill was used instead of the three-roll mill, similar results were obtained.

EXAMPLES 40-53

C.I. Pigment Blue 15 was dispersed in a nitro cellulose lacquer in an amount of 5.5% to obtain a comparative dispersion. On the other hand, after dispersion of C.I. Pigment Blue 15, pigment dispersants of the invention were added so that the content of the pigment was 5.5%, thereby obtaining paints. This procedure was repeated using other types of pigments and/or pigment dispersants of the invention, thereby obtaining dispersions for comparison and paints using the dispersants of the invention. These dispersions and paints were subjected to measurement of viscosity, with the results shown in Table 4.

As will be seen from the results of Table 4, the paints of the invention have better fluidity than the comparative dispersions. When films were formed from the paints, they had good gloss, brightness and color strength.

TABLE 4

Viscosity of Nitro Cellulose Paints (Brookfield BM-type Viscometer)

| Example | Pigment | Symbol for Dispersant | Mixing Ratio | Viscosity Number of Revolutions 6 | 12 | 30 | 60 |
|---|---|---|---|---|---|---|---|
| Com. Ex. | C.I. Pig. Blue 15 | — | — | 7800 | 4500 | 3120 | 2880 |
| Ex. 39 | C.I. Pig. Blue 15 | g | 95:5 | 3980 | 2760 | 2070 | 1860 |
| 40 | C.I. Pig. Blue 15 | g | 90:10 | 4120 | 2910 | 2100 | 1860 |
| 41 | C.I. Pig. Blue 15 | e | 90:10 | 4230 | 2820 | 2310 | 1880 |
| Com. Ex. | C.I. Pig. Red 123 | — | — | 8900 | 6010 | 5430 | 4960 |
| Ex. 42 | C.I. Pig. Red 123 | a | 85:15 | 4110 | 3210 | 1460 | 1200 |
| 43 | C.I. Pig. Red 123 | d | 90:10 | 4230 | 2470 | 1620 | 1010 |
| 44 | C.I. Pig. Red 123 | e | 95:5 | 3130 | 1720 | 1200 | 980 |
| Com. Ex. | C.I. Pig. Yellow 12 | — | — | 12300 | 8200 | 5320 | 4230 |
| Ex. 45 | C.I. Pig. Yellow 12 | b | 90:10 | 5420 | 4100 | 3310 | 2900 |
| 46 | C.I. Pig. Yellow 12 | c | 90:10 | 6310 | 4710 | 3010 | 2770 |
| 47 | C.I. Pig. Yellow 12 | c | 80:20 | 5810 | 4310 | 3020 | 2800 |
| Com. Ex. | C.I. Pig. Orange 168 | — | — | 2300 | 2010 | 1800 | 1650 |
| Ex. 48 | C.I. Pig. Orange 168 | b | 90:10 | 1230 | 920 | 680 | 610 |
| 49 | C.I. Pig. Orange 168 | c | 90:10 | 1310 | 980 | 880 | 710 |
| 50 | C.I. Pig. Orange 168 | c | 90:10 | 1210 | 980 | 730 | 620 |
| Com. Ex. | C.I. Pig. Black 177 | — | — | 13400 | 11000 | 6280 | 4990 |
| Ex. 51 | C.I. Pig. Black 177 | g | 95:5 | 6920 | 5610 | 4720 | 3910 |
| 52 | C.I. Pig. Black 177 | g | 90:10 | 7100 | 6210 | 5230 | 4700 |
| 53 | C.I. Pig. Black 177 | f | 85:15 | 8910 | 6310 | 4370 | 4200 |

Some of the dispersions and paints indicated in were stored at 50° C. for 3 months, followed by measuring the viscosity. The results are shown in Table 5, revealing that the paints of the invention have better storage stability.

TABLE 5

Viscosity Immediately and 3 Months after Preparation of Nitro Cellulose Paints (Brookfield BM-type Viscometer)

| Example | Pigment | Symbol for Dispersant | Mixing Ratio | Viscosity Number of Revolutions | Viscosity (cps.) 6 | 12 | 30 | 60 |
|---|---|---|---|---|---|---|---|---|
| Com. Ex. | C.I. Pig. Blue 15 | — | — | Immediately | 7800 | 4500 | 3120 | 2880 |
|  | C.I. Pig. Blue 15 | — | — | 3 months after | 12300 | 7560 | 5230 | 3210 |
| Ex. 39 | C.I. Pig. Blue 15 | g | 95:5 | Immediately | 3980 | 2760 | 2070 | 1860 |
|  | C.I. Pig. Blue 15 | " | " | 3 months after | 4120 | 2900 | 2130 | 1910 |
| Com. Ex. | C.I. Pig. Red 123 | — | — | Immediately | 8900 | 6010 | 5430 | 4960 |
|  | C.I. Pig. Red 123 | — | — | 3 months after | 13000 | 6200 | 6300 | 5210 |
| Ex. 43 | C.I. Pig. Red 123 | d | 90:10 | Immediately | 4230 | 2470 | 1620 | 1010 |
|  | C.I. Pig. Red 123 | " | " | 3 months after | 4330 | 2590 | 1690 | 1330 |
| Com. Ex. | C.I. Pig. Orange 36 | — | — | Immediately | 2300 | 2010 | 1800 | 1650 |
|  | C.I. Pig. Orange 36 | — | — | 3 months after | 9300 | 7600 | 6200 | 5310 |
| Ex. 48 | C.I. Pig. | b | 90:10 | Immediately | 1230 | 920 | 680 | 610 |

TABLE 5-continued

Viscosity Immediately and 3 Months after Preparation of Nitro Cellulose Paints (Brookfield BM-type Viscometer)

| Example | Pigment | Symbol for Dispersant | Mixing Ratio | Viscosity Number of Revolutions | Viscosity (cps.) | | | |
|---|---|---|---|---|---|---|---|---|
| | | | | | 6 | 12 | 30 | 60 |
| | Orange 36 C.I. Pig. Orange 36 | " | " | 3 months after | 1290 | 960 | 690 | 650 |

EXAMPLE 54

Aminoacrylic Baking Paint

C.I. Pigment Orange 36 was dispersed in an aminoacrylic baking paint varnish in an amount of 6% to obtain a comparative varnish. On the other hand, after dispersion of the Orange 36, pigment dispersant (c) was added so that the ratio of dispersant (c) to the Orange 36 was 10/90. The paints were compared with each other with respect to fluidity, with the result that the paint of the invention was much better than the comparative paint.

Moreover, the above paints were each cut with an aluminum paint base, which had been previously prepared using an aminoacrylic paint varnish, in such a way that the ratio of the pigment and aluminum was 1/5. The paint of the invention exhibited very bright color and good gloss.

EXAMPLE 55

Urethane Paint Varnish

C.I. Pigment Yellow 95 was dispersed in a urethane paint varnish in an amount of 10% to obtain a comparative paint. On the other hand, after dispersion of the Yellow 95, pigment dispersant (c) was added in a ratio of the dispersant to the Yellow 95 of 10/90, thereby obtaining a paint of the invention. These paints were compared with respect to fluidity and the state of film, with the result that the paint of the invention had better fluidity and better film gloss.

EXAMPLE 56

Rosin-modified Phenolic Resin Offset Ink

C.I. Pigment Red 53 was dispersed in a rosin-modified phenolic resin offset ink varnish in an amount of 30% to obtain a comparative ink. On the other hand, after dispersion of the C.I. Pigment Red 53, a pigment dispersant (a) was added to the dispersion so that the ratio between the dispersant (a) and the Red 53 was 15/85, thereby obtaining an offset ink of the invention. The inks were compared with each other with respect to fluidity by the use of a parallel plate viscometer. As a result, it was found that the ink of the invention was much better than the comparative ink.

What is claimed is:

1. A pigment composition consisting of 100 parts by weight of a pigment, and from 0.1 to 30 parts by weight of a pigment dispersant of formula

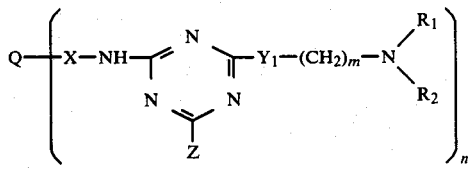

wherein Q is a member selected from the group consisting of an anthraquinone dye or pigment radical, azo dye or pigment radical, benzimidazolone dye or pigment radical, phthalocyanine dye or pigment radical, quinacridone dye or pigment radical, dioxazine dye or pigment radical, anthrapyrimidine dye or pigment radical, anthrathrone dye or pigment radical, indanthrone dye or pigment radical, falvanthrone dye or pigment radical, pyranthrone dye or pigment radical, perinone dye or pigment radical, perylene dye or pigment and thioindigo dye or pigment radical; X is a direct bond, —CH$_2$—;

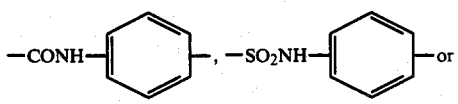

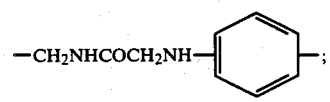

$Y_1$ is NH or —O—; Z is

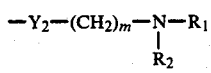

wherein $Y_2$ is —NH— or —O—, or —NH—X—Q when n is 1; $R_1$ and $R_2$ are independently an alkyl group containing 1-18 carbon atoms, or are jointly combined to form a pereridine, pyrrolidine, pipecoline or morpholine ring with said nitrogen atom to which they are attached; m is an integer of 1 to 6; and n is an integer of 1 to 4.

2. A pigment composition according to claim 1 wherein the pigment dispersant is

6. A pigment composition according to claim 1 wherein the pigment dispersant is

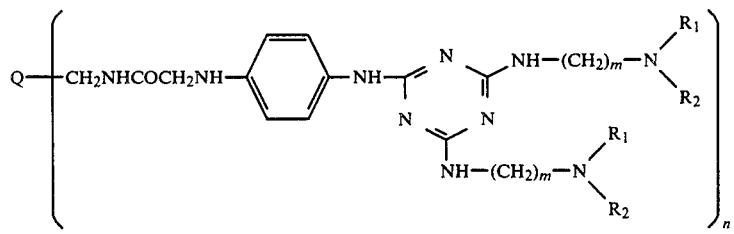

7. A pigment composition according to claim 1 wherein the pigment dispersant is

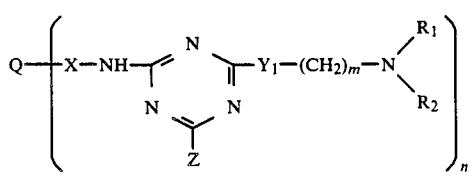

in which $R_1$ and $R_2$ are each independently an alkyl group having 1 to 4 carbon atoms.

8. The pigment composition according to claim 1 wherein the pigment dispersant is

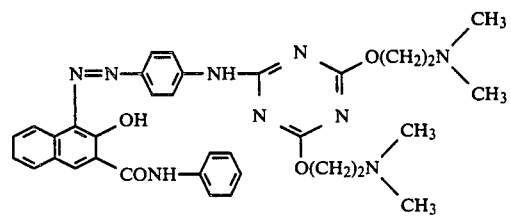

or

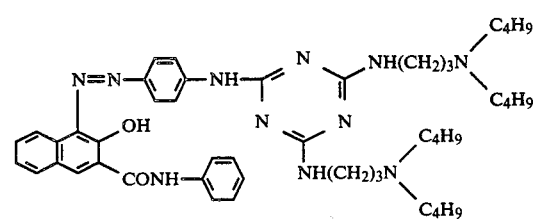

9. A pigment composition according to claim 1 wherein the pigment dispersant has the formula

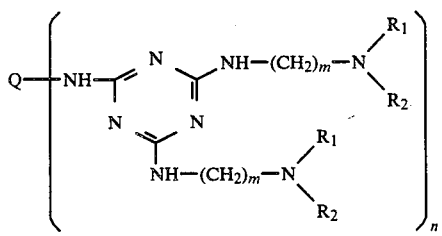

3. A pigment composition according to claim 1 wherein the pigment dispersant is

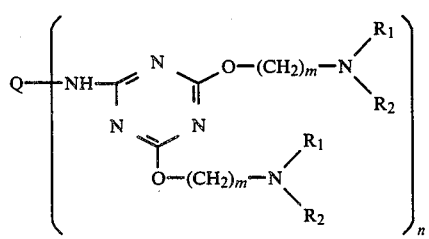

4. A pigment composition according to claim 1 wherein the pigment dispersant is

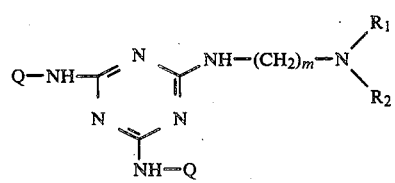

5. A pigment composition according to claim 1 wherein the pigment dispersant is

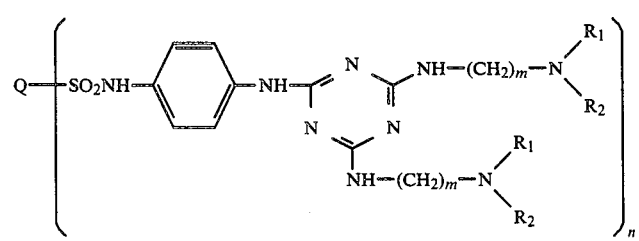

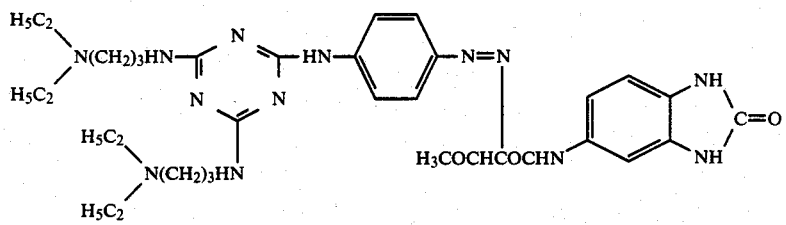
10. A pigment composition according to claim 1 wherein the pigment dispersant has the formula
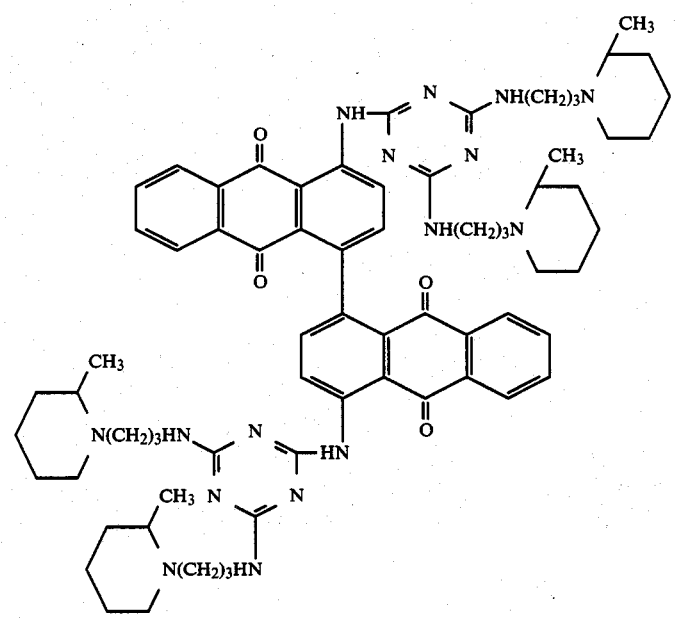
or
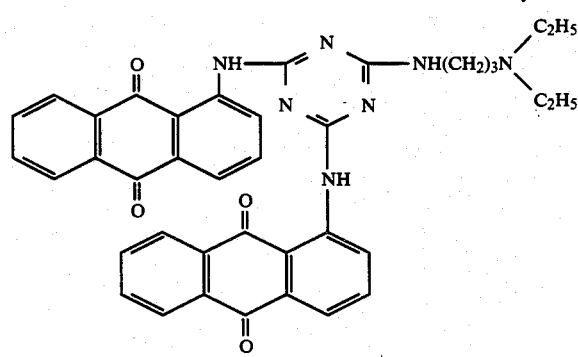
11. A pigment composition according to claim 1 wherein the pigment dispersant has the formula
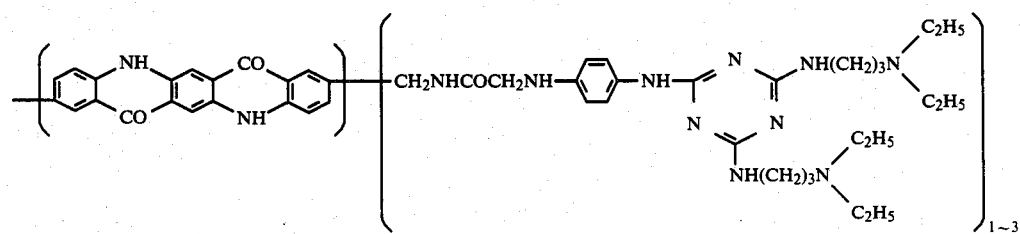

-continued
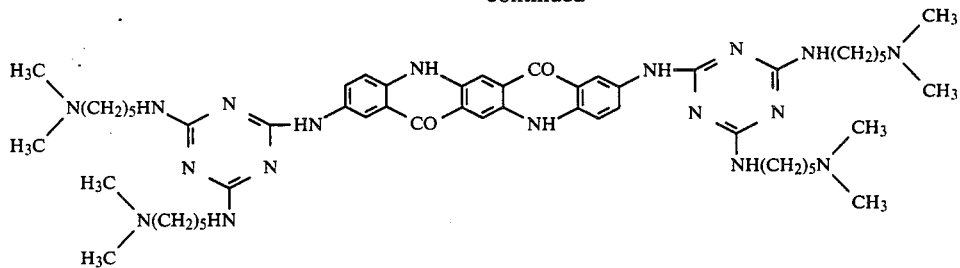
or
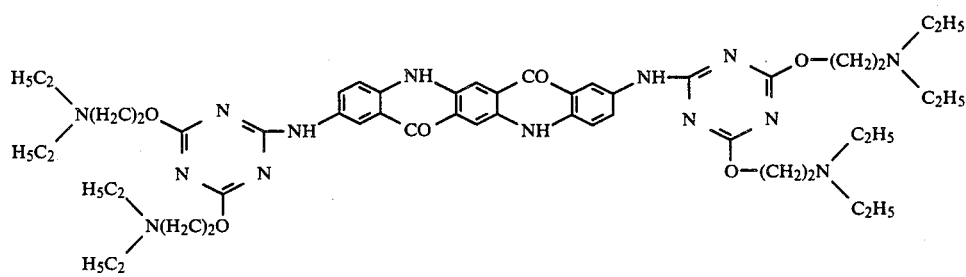
or
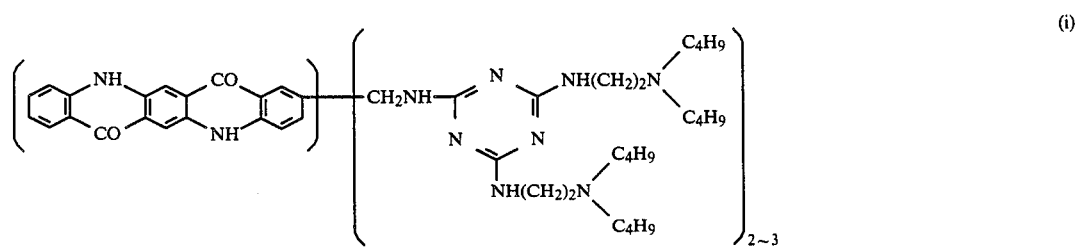
12. A pigment composition according to claim 1 wherein the pigment dispersant has the formula
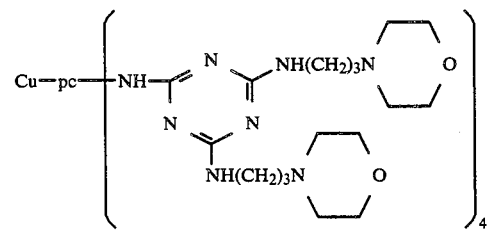
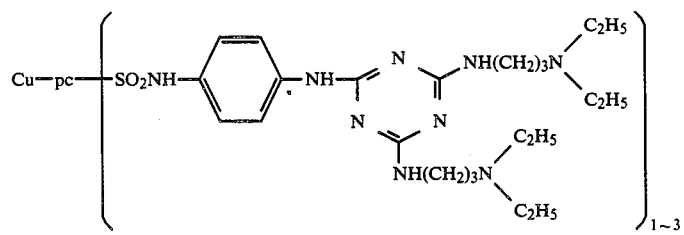
in which Cu-pc represents a copper phthalocyanine moiety.
* * * * *